(No Model.)
E. I. BRANNAN.
CIRCLE CYCLE.
No. 605,629. Patented June 14, 1898.
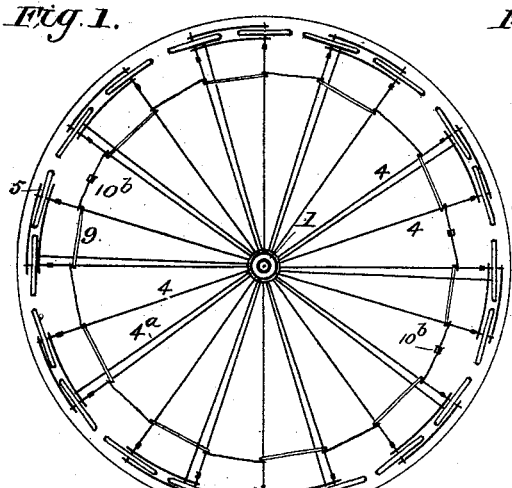
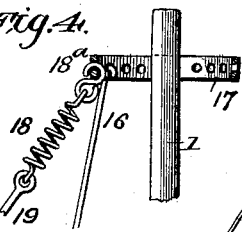
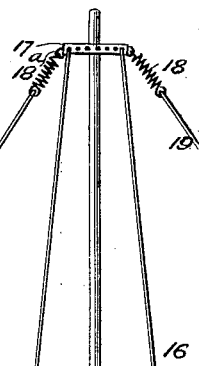
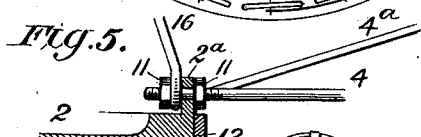
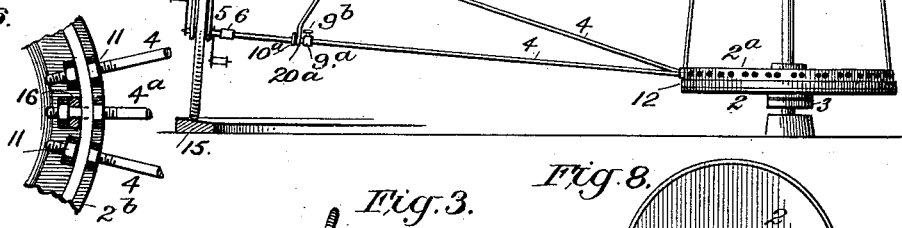
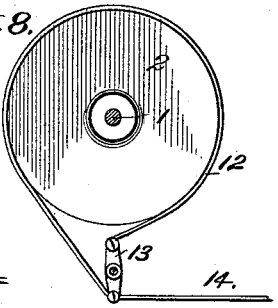
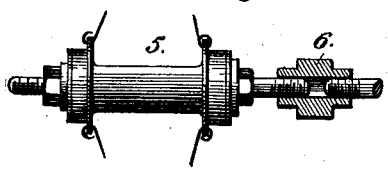
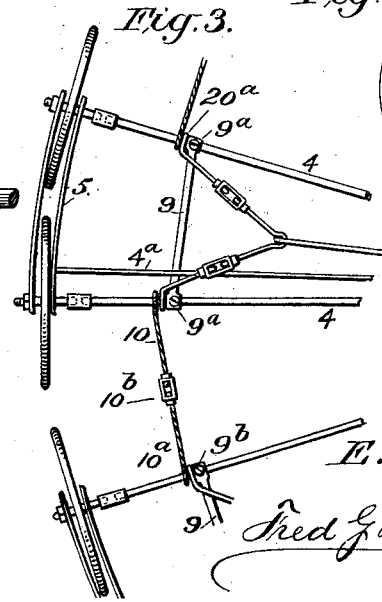
WITNESSES:
Edwin L. Bradford
H. L. Marsh
INVENTOR
E. I. Brannan
BY
Fred G. Dieterich & Co.
ATTORNEYS
THE NORRIS PETERS CO., PHOTO-LITHO., WASHINGTON, D. C.

UNITED STATES PATENT OFFICE.

EDWARD INDEPENDENCE BRANNAN, OF RICHMOND, VIRGINIA.

CIRCLE-CYCLE.

SPECIFICATION forming part of Letters Patent No. 605,629, dated June 14, 1898.

Application filed September 17, 1897. Serial No. 651,998. (No model.)

*To all whom it may concern:*

Be it known that I, EDWARD INDEPENDENCE BRANNAN, residing at Richmond, in the county of Henrico and State of Virginia, have invented a new and Improved Circle-Cycle, of which the following is a specification.

This invention relates to that class of apparatus which includes roundabouts, flying-horses, &c., and it more particularly refers to improvements on an apparatus of this character patented by me September 7, 1897, No. 589,408.

My present invention has for its object to simplify the construction of apparatus whereby the ordinary forms of bicycles may be readily made a part of the same and the sensation and pleasure of regular bicycle riding may be more fully obtained.

This invention also comprehends a novel means for joining the several bicycle-frames forming the complete circle in a non-rigid manner, whereby each bicycle will have practically an independent movement in its circular direction, it also having for its purpose to provide simple means for holding the unoccupied bicycle or other carriage frames free from contact with the trackway to reduce friction and unnecessary wear.

Another object of this invention is to connect the circle of bicycle or other carriage frames yieldingly to the center post, so that the sense of rigid joining of such frames with the said center post to the rider is reduced to a minimum.

With other objects in view, which will hereinafter appear, this invention consists in the peculiar combination and novel arrangement of parts, such as will be first described in detail, and then be specifically pointed out in the appended claims, reference being had to the accompanying drawings, in which—

Figure 1 is a diagrammatic plan view of my improved circle-cycle. Fig. 2 is an elevation of a portion thereof, illustrating the manner of connecting the bicycle or other carriage frame to the center post. Fig. 3 is a detail plan view illustrating the manner of bracing each frame-section and yieldingly connecting a pair of such frame-sections. Fig. 4 is a detail view of the upper end of one of the hanger-rods and the connecting-ring. Figs. 5 and 6 are detail views illustrating the manner of connecting the radial arms or rods to the turn-wheel. Fig. 7 is a detail view of one of the union-couplings. Fig. 8 illustrates the form of brake-band adapted to engage the turn-wheel.

In the practical construction of my present invention a central post 1 has at its lower end a turn-wheel 2, which may be held to turn loosely on the post and is supported on a bearing-rim 3 or connected to a vertically-adjustable bearing-collar having suitable ball-bearings, as shown in my other patent referred to.

In the present construction the wheel 2 has a vertical flange $2^a$ apertured to receive the threaded ends of the radial arms 4, three of which in this form being used for each bicycle frame or carriage—two outer ones, which connect with the front and rear axles of the bicycle-frame 5 by a right and left union 6, (see Fig. 7,) and a central one $4^a$, which connects with the top bar of the bicycle-frame, and in practice preferably between the ears of the handle-post clamp member 8, whereby to dispense with superflous fittings, it being understood, however, that the said central arm may be connected to the upper part of the bicycle frame or carriage in such a manner and at such point as may be found most desirable.

The bicycle or carriage frames may be of any suitable construction, preferably such, however, as shown in my other patent referred to. In all cases, however, such frames are bent on an arc, having the post as a center to suit the curvature of the track, whereby to bring all of the wheels in proper relation to the track, so as to prevent friction and wear of same. The radial arms are made of yielding material and the front ends of the lower members of each set are braced by detachable spanners 9, formed of stout bars or rods having eyes $9^a$ at the ends. These spanners are slipped over the ends of the arms 4 before they are connected to the bicycle-frame and are held to a proper adjustment by the lock-screws $9^b$, such spanners in practice being placed about eighteen inches inside of the cycles to provide for a free pedal action of the rider.

To make the connections between the several frames continuous on the line of spanners around the circle, the several sections are joined by any yielding material, preferably wire cables 10, having eyes or rings 10ª at the ends, whereby they can be readily slipped over the outer ends of the arms 4, they being of such lengths as to take up the distance between the sections. Any number of the connections 10 may be provided with turnbuckles 10ᵇ to take up slack on the circular line of the spanners.

As before stated, the turn-wheel 2 has a flange for the threaded inner ends of the arms, which are adjusted longitudinally and held to their proper position by the inner and outer nuts 11 11. The lower part of the turn-wheel has an annular flange 2ᵇ, which forms a support for the brake-band 12, the ends of which join with a rock-lever 13, one end of which has connected therewith an operating rod or cable 14, (see Fig. 8,) which extends under the apparatus to a suitable point near the attendant or cycle-operator.

As in my former patent, the trackway 15 is inclined inward to give the frames an inward inclination to overcome the tangential thrust and cause them to run uniformly in their circle path.

To either suspend the wheels entirely clear of the track or to take up the weight of the radial arms which connect with the bicycles and throw such weight back on the center, I provide brace-rods 16 of suitable number, preferably one for each frame-section, the lower ends of which are apertured, slipped over the inner threaded ends of the central rods 4ª, and secured by the same nut which secures such rods, while their upper ends are secured to a band 17, encircling the upper end of the post 1, held free thereof, (or secured thereto,) as shown in Fig. 2.

At points intermediate the upper ends of the rods 16 the band has apertures to receive the hooked ends 18ª of stout springs 18, which connect to hanger rods or cables 19, the lower ends of which have yoke-hangers 20, the ends of which have eyes 20ª to slip over the ends of the radial arms, and such hangers 20 have turnbuckles 21, as clearly shown in Fig. 3.

By providing hanging supports for the frame of the character described it is obvious that when of the proper tension the hanger-rods 19 will serve to lift the bicycle-frames clear of the track when not occupied and take up the weight of the radial arms when such frames are occupied, and thereby leave such bicycle-frames practically free of any weight to carry but that of the rider, and by providing the yoke-sections with turnbuckles the tension of the spring-rods 19 can be regulated as found necessary to raise the wheel-frame from traction.

While I have shown no motive power for operating the cycle, (as the power may be entirely supplied by the riders,) yet I desire it understood that any motive power may be applied when desired, which may be in the the nature of a motor-cycle in the circle or suitable gearing connected with the turn-wheel.

While I have not illustrated the same in this case, I desire it understood that in the practical application of my present invention a plurality of trackways and bicycle or carriage frames may be used, and the carriages may be in the nature of animal or bird dummies.

By making the radial arms and connections between the sections yielding it relieves the bicycles of undue strain from any direction and at the same time breaks the rigidity on the circle, thereby reducing the danger of accidents to a minimum, as the arrangement of parts is such that any wheel can be easily raised from the track by one hand from twelve to fifteen inches independent of the other wheels, thereby making it impossible for one to get more than the force of one bicycle.

By trussing over the center, as shown, the weight is taken from the bicycles and thrown back on center.

By curving frame on line of circle the friction and wear on tires are materially reduced and all wheels held in a proper alinement.

As the flexible wires which connect the several sections are in practice made very light, a person approaching the cycle only sees bicycles and riders, as the radial arms are below the bicycle-frames, thereby giving the effect of separate riders traveling on a circular path.

Changes in the exact construction of parts may be made without departing from the scope of the appended claims.

Having thus described my invention, what I claim, and desire to secure by Letters Patent, is—

1. In an apparatus as described, the combination with the turn-wheel, the post and the overhead support secured to and rotatable with the turn-wheel, the radial arms and the wheeled frames, of the hanger members having springs at their upper end connected to the overhead support, their lower ends being connected to the radial arms and provided with tension devices, all substantially as shown and for the purposes described.

2. In an apparatus as described, the combination with the turn-wheel and a wheeled carriage or bicycle, of radial arms arranged in series of three secured at their inner end to the turn-wheel, the ends of the outer arms being detachably connected with the front and rear axles of the carriage or frame, the center one to the top of such frame, and spanners connecting the two outer or bottom arms, substantially as shown and for the purposes described.

3. An apparatus as described, consisting of the central post the top of which is provided with a support, the base of said post having rotatably secured thereon a turn-wheel, radial arms, arranged in series, having one of their ends secured to said turn-wheel, their other ends being attached to vehicles, a detachable spanner connecting the outer arms of each series, a separate cable connecting the several series, and spring-hangers attached to the said support at the top of the central post adapted to form supports for the said radial arms.

4. An apparatus as described, consisting of the central post, the top of which is provided with an apertured band, the base of said post being provided with a turn-wheel, radial arms attached to said turn-wheel, and means for supporting said radial arms, consisting of hangers having one of their ends attached to the said radial arms, their other ends being provided with springs adapted to be hooked within the said apertures in the said band at the top of the central post.

5. An apparatus as described, consisting of the central post, the top of which is provided with a circular band provided with apertures, the base of said post having rotatably mounted thereon a turn-wheel, radial arms attached to the said turn-wheel, their outer ends being attached to suitable vehicles, said radial arms being arranged in series and provided with detachable braces, cables connecting each of said series to the other, and hangers having one of their ends secured to said radial arms, their other ends being provided with a spring adapted to be hooked within the said supporting-band.

6. An apparatus as described, consisting of a central post, the top of which is provided with an annular supporting-band having apertures therein, the base of said post being provided with a turn-wheel, radial arms connected to said turn-wheel, said radial arms being arranged in series of three, detachable braces for said radial arms, and pendent hangers provided with yoked ends adapted to support the said radial arms.

7. An apparatus as described, consisting of a central post the top of which is provided with an annular band having apertures therein, the base of said post being provided with a turn-wheel, radial arms connected to said turn-wheel, braces detachably secured to said radial arms, and hangers having one of their ends provided with yokes adapted to be attached to the said radial arms their other ends being provided with a spring having a hooked end adapted to be hooked with the said apertures in the said annular band.

8. An apparatus as described, consisting of the central post having a turn-wheel at its base and a supporting-band at its top, said supporting-band being provided with apertures, radial arms connected to the said turn-wheel, said radial arms being arranged in series of three, a detachable brace for each series of radial arms, a yielding cable adapted to connect one series to the other, and pendent hangers, the upper ends of which are provided with springs adapted to be hooked within the said apertures in the said supporting-band, their lower ends being provided with yoke-hangers adapted to be attached to the outer members of each of said radial arms.

EDWARD INDEPENDENCE BRANNAN.

Witnesses:
R. S. ALLEN, Jr.
C. H. PERRY.